3,294,808
N-ACYL DERIVATIVES OF CYCLIC IMINES

Evald L. Skau, Robert R. Mod, and Frank C. Magne, all of New Orleans, La., assignors to the United States of America as represented by the Secretary of Agriculture
No Drawing. Application Apr. 2, 1964, Ser. No. 361,925, now Patent No. 3,248,396, dated Apr. 26, 1966, which is a division of application Ser. No. 260,923, Feb. 25, 1963, now Patent No. 3,219,612, dated Nov. 23, 1965. Divided and this application Sept. 10, 1965, Ser. No. 509,447

8 Claims. (Cl. 260—294.7)

This application is a division of Serial No. 361,925, filed April 2, 1964, now U.S. Patent No. 3,248,296, which was a division of Serial No. 260,923, filed February 25, 1963, now United States Patent No. 3,219,612.

A non-exclusive, irrevocable, royalty-free license in the invention herein described, throughout the world for all purposes of the United States Government, with the power to grant sublicenses for such purposes, is hereby granted to the Government of the United States of America.

This invention relates to certain compounds which are N-acyl derivatives of cyclic imines, to some unique mixtures of N-acyl derivatives of cyclic imines, and to plastic compositions, the plasticizer component of which is at least one of the compounds or one of the unique mixtures that are the subject of this invention. More particularly, this invention relates to N,N-disubstituted long chain aliphatic amides the acyl component of which if saturated is an alkanoic acyl containing from 10 to 18 carbon atoms, and if unsaturated is an alkenoic acyl containing from 18 to 22 carbon atoms, the amide nitrogen in all cases being a member of a heterocyclic ring or in the case of a fused ring system one of the heterocyclic rings, all of the other ring members being carbon or nitrogen atoms.

The invention to which the present application is specifically directed relates to certain long-chain fatty acid amides of unsubstituted and alkyl-substituted piperidines.

We have discovered that the compounds that are the subject of this invention are good, compatible, solvent-type plasticizers for vinyl chloride resins. Moreover, these compounds are efficient primary solvent-type plasticizers which can be made from low price fatty acids and which exhibit good compatibility with and impart low volatility loss, resistance to microbial action, excellent low temperature properties, and stability to northern light exposure to polymer and copolymer resins of vinyl chloride.

The terms "vinyl type resin" and "vinyl chloride resin" are used throughout this specification to refer to polymers and copolymers of monomers containing vinyl chloride in a predominant proportion by weight. Terms such as "compatible," "good compatibility," and "compatible plasticizer" in reference to the plasticizers which are the subject of this invention are used throughout the specification to refer to plasticizers that show no sign of exudation, migration to the surface, for at least two weeks when the plasticizers are present in the resin in proportions of about 70 parts by weight of plasticizer to 100 parts by weight of resin.

Not only are the compounds that are the subject of this invention useful as plasticizers for vinyl chloride resins, but they are also efficient, compatible softeners for Buna N rubber, imparting low volatility loss and excellent low temperature properties to the plasticized rubber compositions.

If a resin is plasticized with a compound with which it has only limited compatibility, the plasticizer soon exudes or migrates to the surface unless the plasticizer is used either in a limited amount or is used in conjunction with a mutual solvent (a compatible auxiliary plasticizer) to obtain adequate compatibility.

It is known in the art that compounds similar to those which are the subject of this invention exhibit reasonably good compatibilty for hydrophylic type resins but in order to obtain adequate flexibility must be employed together with a secondary or an auxiliary plasticizer as seen for example in United States Patent Number 2,339,056.

It would be expected from the recognized compatibility of compounds related to the type herein described with polyvinyl acetals (hydrophylic type resins), that these compounds would be quite incompatible with polymers of the vinyl chloride type. We have discovered, however, that not only are the particular compounds and compound mixtures herein described compatible as primary plasticizers with vinyl chloride resins but as we note above they are compatible with the hydrophylic type resins as well.

The specific component ratio of compatible compositions can be established according to the scheme set forth in our U.S. Patent No. 3,219,664, for example.

The compounds that are the subject of this invention are conveniently prepared by reacting the appropriate piperidine compound with the appropriate acid or corresponding acid chloride. In any event, methods for preparing compounds such as those herein described are well known to those skilled in the art of fatty acid chemistry. The details of individual preparations are listed in the operating examples which follow:

EXAMPLE 1

*N-oleoylpiperidine.*—Twenty-two and four-tenths grams (0.26 mole) of piperidine were dissolved in 60 milliliters of benzene and 39.7 grams (0.13 mole) of oleoyl chloride were added dropwise with stirring. After stirring for an additional hour, the reaction mixture was filtered, washed successively with dilute hydrochloric acid and water, and dried over anhydrous sodium sulfate. Free acid was removed by percolating the benzene solution through a column of activated alumina and eluting the amide with a 1:1 ethanol-benzene mixture. The solvent was then removed by stripping under reduced pressure. Analysis of the product, N-oleoylpiperidine: Percent C, 78.15 (theory 78.95); percent H, 12.07 (theory 12.40); percent N, 4.04 (theory 4.04).

EXAMPLE 2

*N-oleoyl-2-methylpiperidine.*—A mixture of 31.6 grams (0.32 mole) of 2-methylpiperidine, 60 grams (0.21 mole) of oleic acid, and 20 milliliters of benzene was refluxed in an apparatus equipped with a Dean-Stark trap until the evolution of water ceased. The reaction mixture was diluted with 150 milliliters of commercial hexane, washed successively with dilute hydrochloric acid and water, and dried over anhydrous sodium sulfate. Free acid was removed by percolating the hexane solution through a column of activated alumina, and eluting the amide with a 1:1 hexane-ethanol mixture. The solvent was removed by stripping under reduced pressure. Analysis of the product, N-oleoyl-2-methylpiperidine: Percent C, 78.87 (theory 79.20); percent H, 12.13 (theory 12.47); percent N, 3.86 (theory 3.85).

EXAMPLE 3

*N - oleoyl - 3 - methylpiperidine.*—N-oleoyl - 3 - methylpiperidine was prepared by the procedure of Example 2 from 31.6 grams (0.32 mole) of 3-methylpiperidine, and 60 grams (0.21 mole) of oleic acid. Analysis of the product, N-oleoyl-3-methylpiperidine: Percent C, 79.03 (theory 79.20); percent H, 12.30 (theory 12.47); percent N, 3.89 (theory 3.85).

EXAMPLE 4

*N - oleoyl - 4 - methylpiperidine.*—N - oleoyl - 4 - methylpiperidine was prepared by the procedure of Example 2 from 31.6 grams (0.32 mole) of 4-methylpiperidine and 60 grams (0.21 mole) of oleic acid. Analysis of the product, N-oleoyl-4-methylpiperidine: Percent C, 78.80 (theory 79.20); percent H, 12.08 (theory 12.47); percent N, 3.86 (theory 3.85).

EXAMPLE 5

*N - oleoyl - 4 - ethylpiperidine.*—N - oleoyl - 4 - ethylpiperidine was prepared by the procedure of Example 2 from 14.4 grams (0.13 mole) of 4-ethylpiperidine and 30 grams (0.11 mole) of oleic acid. Analysis of the product, N-oleoyl-4-ethylpiperidine: Percent C, 79.17 (theory 79.45); percent H, 12.62 (theory 12.45); percent N, 3.75 (theory 3.71).

EXAMPLE 6

*N - oleoyl - 2 - methyl - 5 - ethylpiperidine.*—N - oleoyl-2-methyl-5-ethylpiperidine was prepared from 27 grams (0.21 mole) of 2-methyl-5-ethylpiperidine and 40 grams (0.14 mole) of oleic acid by Example 2, except that toluene was used as the entraining solvent. Analysis of the product, N-oleoyl-2-methyl-5-ethylpiperidine: Percent C, 79.51 (theory 79.66); percent H, 12.40 (theory 12.51); percent N, 3.79 (theory 3.85).

EXAMPLE 7

*N - oleoyl - 2,6 - dimethylpiperidine.*—N - oleoyl - 2,6-dimethylpiperidine was prepared by the procedure of Example 1 from 30.1 grams (0.27 mole) of 2,6-dimethylpiperidine, and 40 grams (0.13 mole) of oleoyl chloride. Analysis of the product, N-oleoyl-2,6-dimethylpiperidine: Percent C, 79.19 (theory 79.12); percent H, 12.43 (theory 12.30); percent N, 3.74 (theory 3.72).

EXAMPLE 8

*N - decanoyl - 4 - nonylpiperidine.*—N - decanoyl - 4-nonylpiperidine was prepared by the procedure of Example 2 from 53 grams (0.25 mole) of 4-nonylpiperidine and 40 grams (0.23 mole) of decanoic acid. Analysis of the product, N-decanoyl-4-nonylpiperidine: Percent C, 78.69 (theory 78.78); percent H, 12.90 (theory 12.96); percent N, 3.76 (theory 3.83).

We claim:
1. N-oleoylpiperidine.
2. N-oleoyl-2-methylpiperidine.
3. N-oleoyl-3-methylpiperidine.
4. N-oleoyl-4-methylpiperidine.
5. N-oleoyl-4-ethylpiperidine.
6. N-oleoyl-2-methyl-5-ethylpiperidine.
7. N-oleoyl-2,6-dimethylpiperidine.
8. N-decanoyl-4-nonylpiperidine.

References Cited by the Examiner

UNITED STATES PATENTS 2,058,013  10/1936  Henke et al. _____ 260—294

FOREIGN PATENTS 327,724  7/1935  Italy.

OTHER REFERENCES

Merck Index, p. 412, 7th ed. (1960), Merck Corp.

WALTER A. MODANCE, *Primary Examiner.*

AVROM D. SPEVACK, *Assistant Examiner.*